(12) United States Patent
Ueda et al.

(10) Patent No.: US 8,719,604 B2
(45) Date of Patent: May 6, 2014

(54) DATA PROCESSING APPARATUS

(75) Inventors: Koichi Ueda, Yokohama (JP); Satoshi Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 405 days.

(21) Appl. No.: 12/915,169

(22) Filed: Oct. 29, 2010

(65) Prior Publication Data

US 2011/0145614 A1 Jun. 16, 2011

(30) Foreign Application Priority Data

Dec. 16, 2009 (JP) ................................. 2009-285742

(51) Int. Cl.
*G06F 1/00* (2006.01)
*G06F 1/26* (2006.01)
*G06F 1/32* (2006.01)

(52) U.S. Cl.
USPC .......................................... 713/320; 713/300

(58) Field of Classification Search
USPC ................................................. 713/300, 320
See application file for complete search history.

(56) References Cited

U.S. PATENT DOCUMENTS

| 5,675,282 A | 10/1997 | Saito ............................. 327/544 |
| 7,019,739 B2 * | 3/2006 | Danis ............................ 345/211 |
| 7,529,202 B2 | 5/2009 | Oshima |
| 2011/0131435 A1 * | 6/2011 | Kitahara ....................... 713/322 |
| 2011/0157614 A1 * | 6/2011 | Ueda et al. ..................... 358/1.9 |

FOREIGN PATENT DOCUMENTS

| CN | 1924761 A | 3/2007 |
| JP | 08-054954 | 2/1996 |
| JP | 2002-229690 A | 8/2002 |
| JP | 2004-078581 A | 3/2004 |

OTHER PUBLICATIONS

Chinese Office Action dated Feb. 16, 2013, in counterpart Chinese Application No. 201010591826.1, and English-language translation thereof.

\* cited by examiner

*Primary Examiner* — Mark Connolly
(74) *Attorney, Agent, or Firm* — Fitzpatrick, Cella, Harper & Scinto

(57) ABSTRACT

A data processing apparatus includes: a receiving unit configured to receive input data including processing-target data from outside; a measuring unit configured to measure the data amount of the processing-target data included in the received input data; a data processing unit configured to perform predetermined processing on the processing-target data, and to output a result of the processing as output data; and a control unit configured to set the data processing unit to an active state based on reception of the input data by the receiving unit, and when the data amount of the output data reaches the data amount of data obtained by performing the predetermined processing on data of the data amount measured by the measuring unit, to set the data processing unit to a sleep state.

7 Claims, 13 Drawing Sheets

DATA PROCESSING APPARATUS

BACKGROUND OF THE INVENTION

1. Field of the Invention

The present invention relates to a technique for realizing power saving in a data processing apparatus.

2. Description of the Related Art

Heretofore, LSIs used in data processing have been focused on more for their processing speed and other capabilities rather than their power consumption. However, in recent years, following increases in the speed and integration density of LSIs, the importance of techniques for reducing power consumption has been increasing, in order to suppress the power consumption of the overall chip.

One way of realizing reduced power consumption in LSIs that has been proposed involves stopping the supply of the clock signal during periods in which processing modules do not need to be operated. For example, a circuit disclosed in Japanese Patent Laid-Open No. 08-054954 (Document 1) detects the input of data to a processing circuit, and supplies a clock signal for a preset period that is long enough for the processing circuit to process the input data. Unnecessary power consumption is then reduced in periods other than when processing is performed by lowering the clock frequency.

However, with the technology set forth in the abovementioned Document 1, there is a problem in that although the supply of a clock signal can be performed for a stipulated period with respect to input data of a predetermined data length, processing cannot be flexibly performed on input data of a variable length.

SUMMARY OF THE INVENTION

The present invention provides a data processing apparatus capable of favorably processing variable-length input data.

According to one aspect of the present invention, a data processing apparatus comprises: a receiving unit configured to receive input data including processing-target data from outside; a measuring unit configured to measure the data amount of the processing-target data included in the received input data; a data processing unit configured to perform predetermined processing on the processing-target data, and to output a result of the processing as output data; and a control unit configured to set the data processing unit to an active state by starting the supply of a clock signal to the data processing unit based on reception of the input data by the receiving unit, and when the data amount of the output data reaches the data amount of data obtained by performing the predetermined processing on data of the data amount measured by the measuring unit, to set the data processing unit to a sleep state in which power consumption is less than in the active state by stopping the supply of the clock signal to the data processing unit.

According to another aspect of the present invention, a data processing apparatus comprises: a receiving unit configured to receive input data including processing-target data from outside; a measuring unit configured to measure the data amount of the processing-target data included in the received input data; a data processing unit configured to perform predetermined processing on the processing-target data, and to output a result of the processing as output data; and a control unit configured to set the data processing unit to an active state by supplying a first voltage to the data processing unit based on reception of the input data by the receiving unit, and when the data amount of the output data reaches the data amount of data obtained by performing the predetermined processing on data of the data amount measured by the measuring unit, to set the data processing unit to a sleep state in which power consumption is less than in the active state by supplying a second voltage that is lower than the first voltage to the data processing unit.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Figure 1:
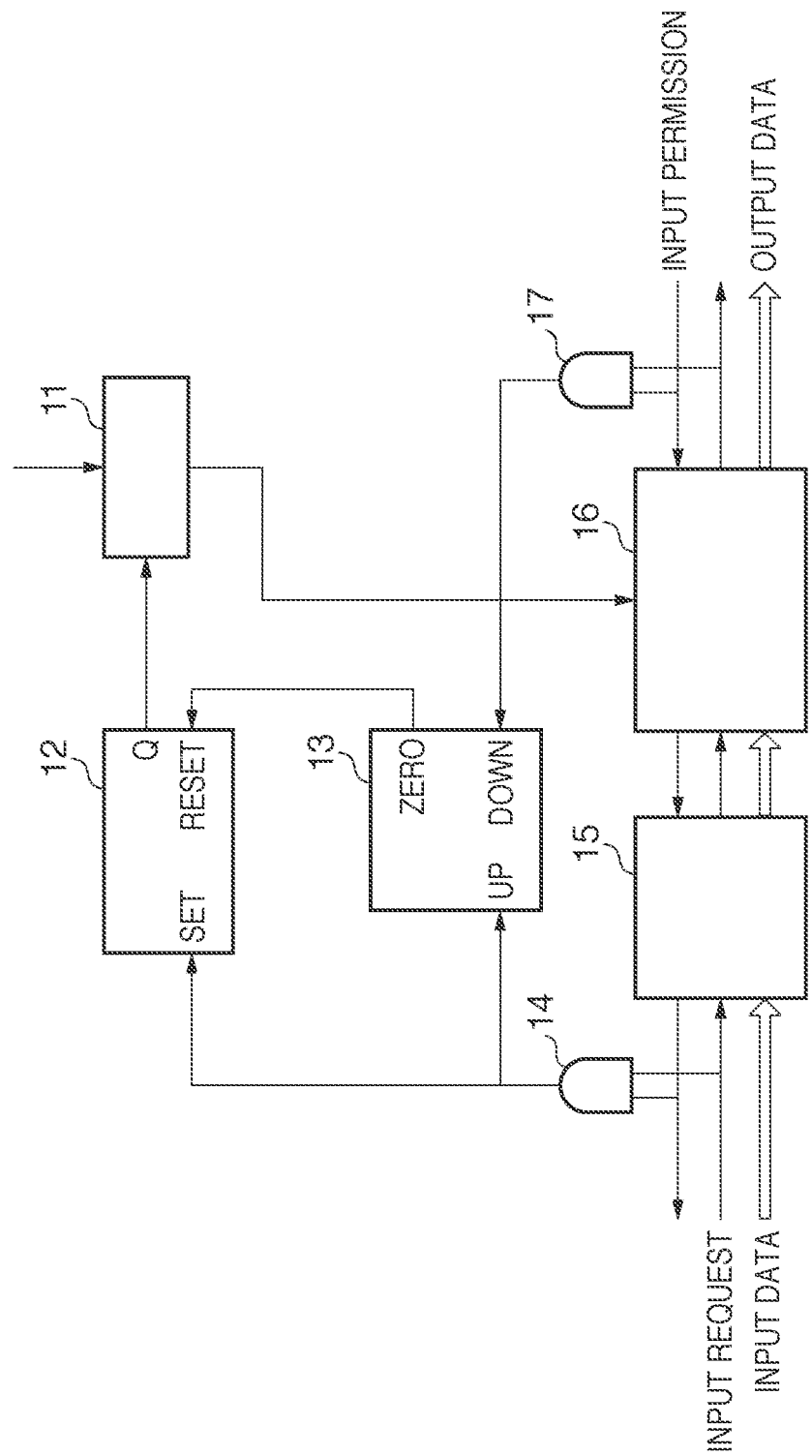
FIG. 1 is a block diagram of a processing circuit module.
Figure 2:
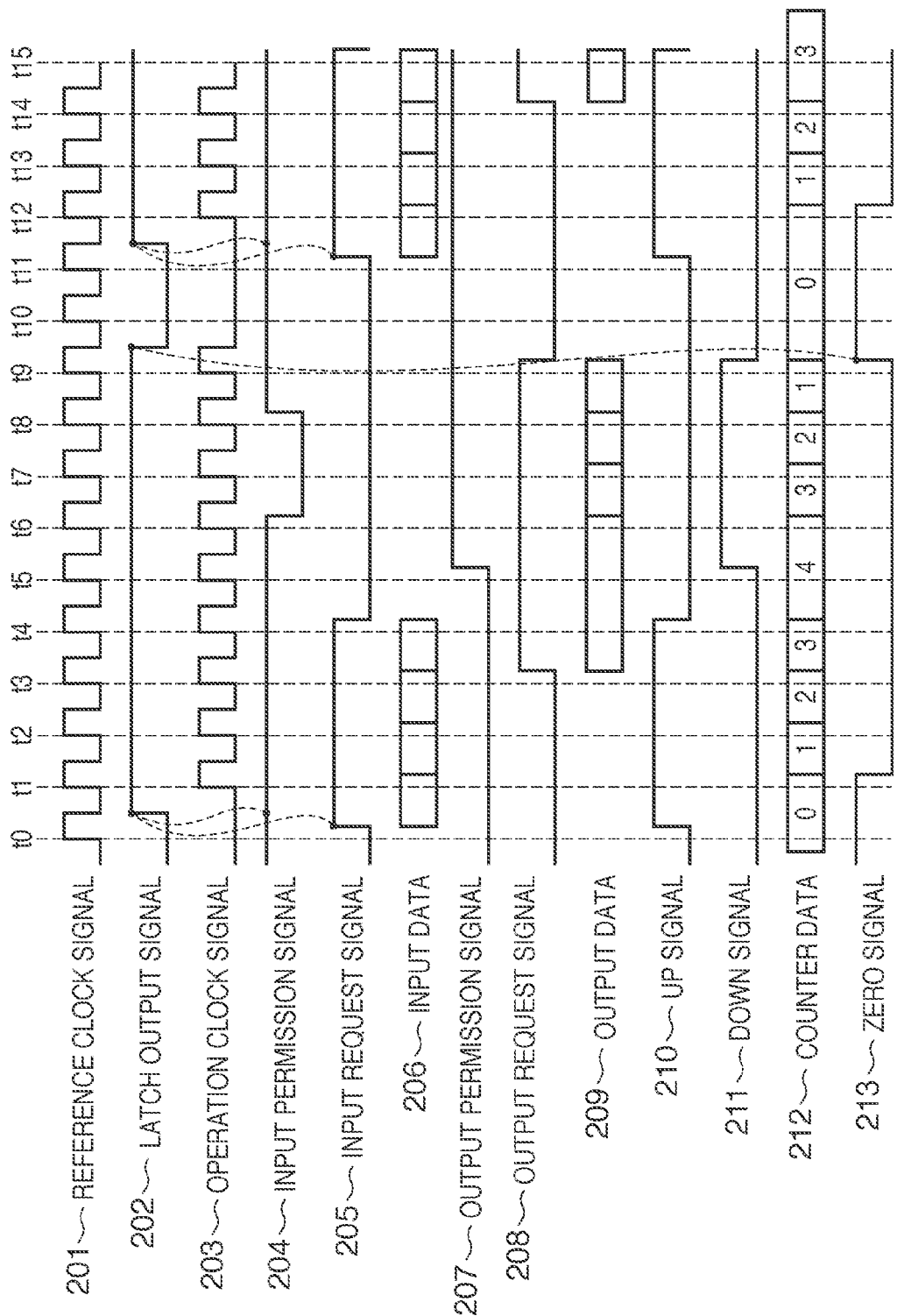
FIG. 2 is a timing chart of the processing circuit module.

FIG. 1 is a block diagram of a processing circuit module according to an exemplary embodiment of the present invention. FIG. 2 is a timing chart of the processing circuit module. A processing module in the present invention denotes a processing module within a printer image processing flow, for example. The example in FIG. 2 shows part of a processing timing chart in the case of processing page image data. A pre-processing module in this processing flow is depicted as a module that performs an intermittent data output operation (e.g., an operation that involves outputting four pieces of data, and then the next four pieces of data after a short interval), such as line thinning of an image.

Hereinafter, operations relating to the various functions of the block diagram shown in FIG. 1 will be described using the timing chart of FIG. 2. An input request signal 205 connected to a pre-processing module (external data processing circuit) that is not shown and for requesting input of data in order to start input of data to be sent from the pre-processing module at time t0 to a processing circuit 1 of the present invention is asserted to "H". A FIFO 15 in FIG. 1 is constantly supplied with a clock signal. Accordingly, input data 206 to be targeted for processing is constantly received by the processing circuit 1, enabling data input to be imported at time t1.

The processing circuit 1 can now receive input of input data 206, and an input permission signal 204 is assumed to be in an "H" state. Accordingly, because the input request signal 205 and the input permission signal 204 have both been asserted to "H", an input detection unit (AND circuit) 14 outputs its output as an input request detection signal after setting the output to "H" when triggered by the assertion of these signals. Based on this input request detection signal, a latch circuit 12 outputs a latch output signal 202 at "H".

Following the output of this latch circuit 12, a clock-signal stopping unit 11 lifts a measure stopping the clock signal of a reference clock signal 201 for supplying to a processing circuit module 16, and resumes clock signal supply and supplies an operation clock signal 203 at time t1. A count unit 13, in response to the output of the input detection unit 14 being asserted to "H", starts counting up at time t1. Counter data is counted up from an initial value 0 to 1, and an Up signal 210 changes to "H". As a result, a "Zero signal" 213 is de-asserted and reverts to zero, indicating that there is unprocessed data. The latch circuit 12 should of course be configured such that the output signal from the input detection unit 14 is prioritized over the "Zero signal" output from the count unit 13.

Data is input at times t2, t3 and t4, and counter data 212 increases and accumulates by 1 per input. Meanwhile, data processed and output by this processing module is output at a delay from the input by a period that depends on the processing in the processing module. In the example in FIG. 2, the processing module is depicted as being able to output once two clock signals have elapsed after input. In other words, an output request signal 208 is asserted immediately after t3. Timings are, however, depicted assuming a post-processing module (not shown) is not ready to receive data at time t4. That is, an output permission signal 207 is still de-asserted at the point in time of t4. The processing circuit module 16 thus holds the output data.

In this example, the input request signal 205 informs the input detection unit 14 of the end of input data 206 by changing to "L" at time t4 in order to cancel the input request. The output of the input detection unit 14 changes to "L" as a result of the input request signal 205 changing to "L". At time t5, the output permission signal 207 changes to "H", and a Down signal 211 of the count unit 13 changes to "H", activating a counting down.

In FIG. 2, timings are depicted assuming the post-processing module becomes able to input data at t5. Output data is output to the post-processing module at times t6, t7, t8 and t9. Following this, the counter data 212 returns to zero at the point in time of t9, and the Zero signal 213 is asserted to "H" at t9. In response to the Zero signal 213 being asserted, the latch output is de-asserted during the t9 cycle, and as a result the clock-signal stopping unit 11 from the t10 cycle stops the operation clock signal supplied to the processing circuit module 16, and the processing module enters a sleep state. Supply of the operation clock signal that was temporarily stopped is resumed as a result of data input being detected again by the input detection unit 14, and the processing module enters the active state (t12).

As described above, clock-signal supply to the data processing circuit is started as a result of the input request signal from the pre-processing circuit changing to "H". The data length (data amount) of input data is then counted up for the duration that the input request signal is "H", and countdown is activated at the point in time at which the input request signal changes to "L" and the input data ends. Countdown is then performed by 1 from the accumulated value every time data is output after the processing of the data processing circuit has ended, and the clock-signal supply is stopped at the point in time at which the count reaches zero.

Controlling the clock-signal supply to the data processing circuit in this way produces the effect of activating the processing module for only the period required for data processing on variable-length (variable-amount) input data, and reducing unnecessary power consumption by placing the data processing circuit in a sleep state for the remaining time.

Figure 3:
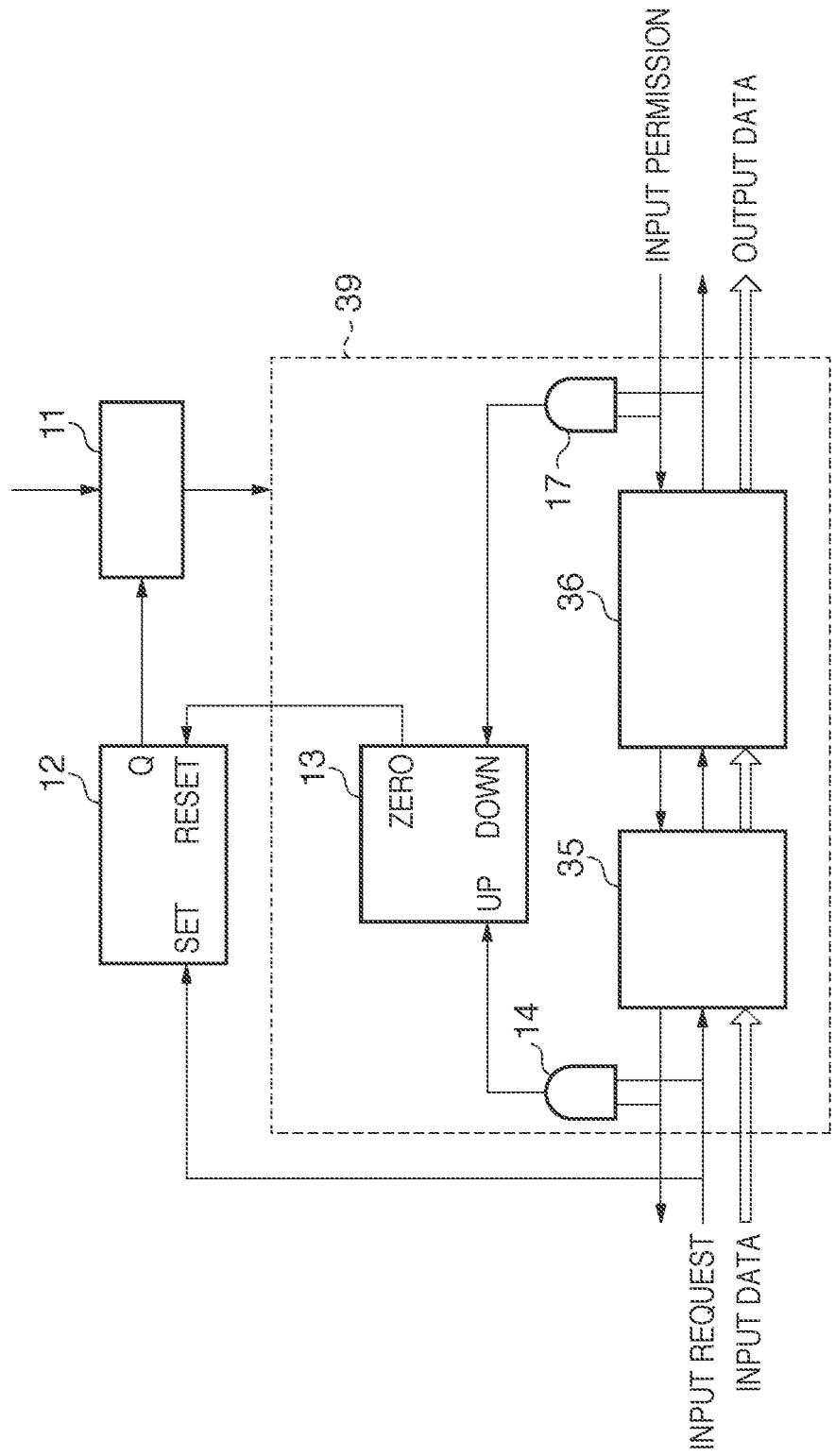
FIG. 3 is a block diagram of a processing circuit module.

The FIFO 15 was not included in the clock-signal supply/stop control target range, but in another exemplary Embodiment, the clock-signal supply/stop control target range is expanded to include the FIFO. FIG. 3 shows an example in the case where control of clock signal supply extends to include the FIFO on the input side.

In this Embodiment, because the clock signal is not constantly supplied, unlike the FIFO 15, input data cannot be stored until the operation clock signal is supplied to the data processing circuit 36. Accordingly, with regard to the head data of the input data, it is necessary for the same data to be supplied and the head data to be reliably input until the data processing circuit 36 and the pre-processing circuit are activated by being supplied with the operation clock signal.

In this Embodiment, the operation clock signal is thus supplied at the same time to a range including the FIFO and the data processing circuit described in FIG. 2. Accordingly, in this Embodiment, a so-called buffer circuit is sufficient, without needing a FIFO for the purpose of storing data. The input request signal to the input detection unit 14 in this case can be substituted with an input request signal to the FIFO. The timing chart in this case will be as shown in FIG. 4.

Figure 4:
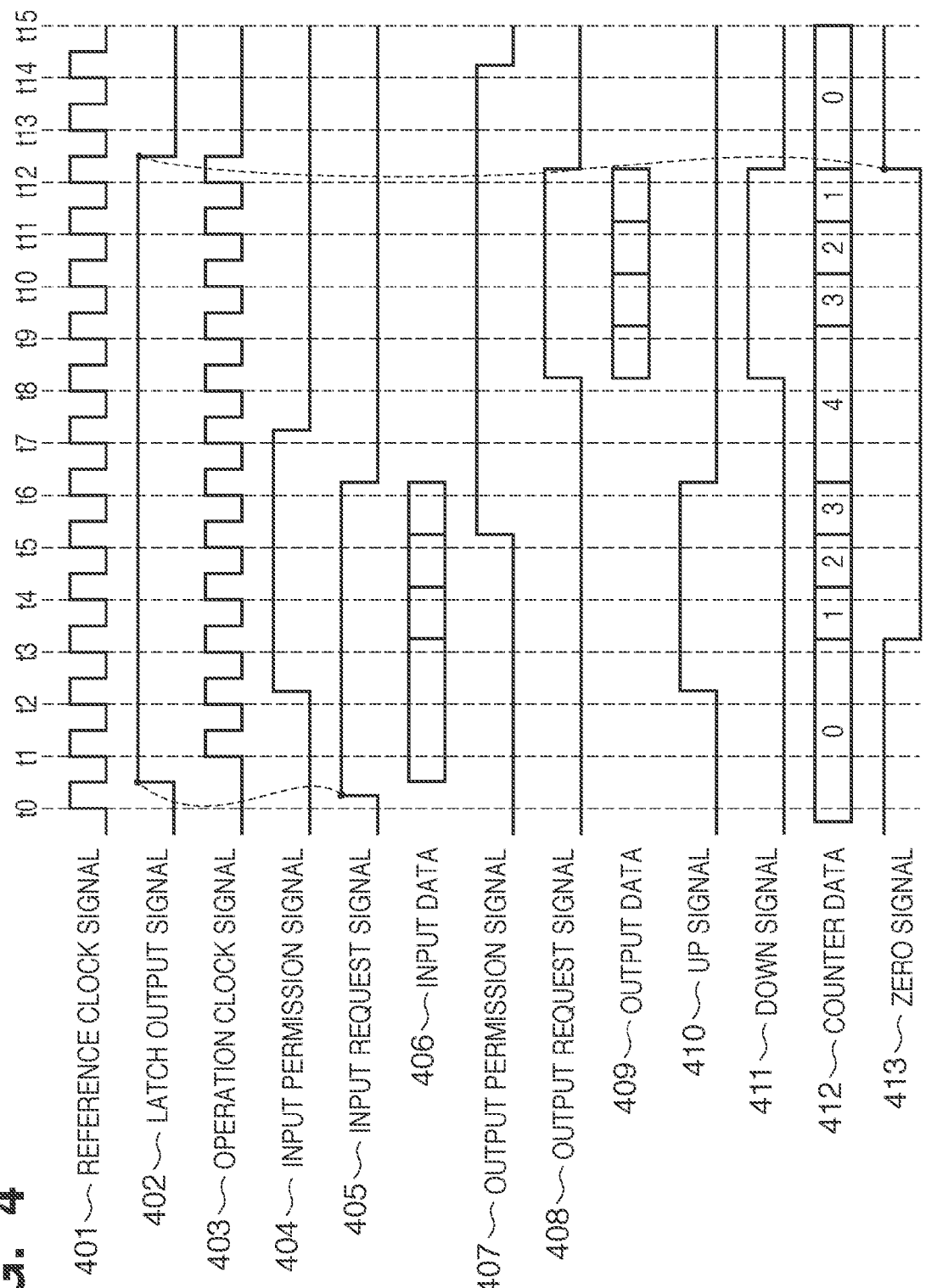
FIG. 4 is a timing chart of the processing circuit module.

In FIG. 4, an input request signal 405 from a pre-processing module (not shown) is asserted. The latch signal of the latch circuit 12 is asserted to "H" when triggered by this assertion. Meanwhile, because the clock signal to an input buffer 35 is in a stopped state, the input permission signal has still not been asserted at this time. Following the assertion of the latch signal to "H", the supply of an operation clock signal 403 is started at time t1 to the circuits in the range shown by a circuit range 39.

Following the start of clock-signal supply and the assertion of the input request signal 405, an input permission signal 404 is asserted at time t2, and reception of input data 406 starts at time t3. Following this, the count value of the count unit 13 increases, and the Zero signal is de-asserted from t3.

The input request signal 405 is de-asserted to "L" at t6, which is when the required number of data outputs is completed. In response to this de-assertion, the input permission signal 404 is de-asserted to "L" at time t7.

As described above, the clock-signal supply to the data processing circuit is started as a result of the head data of input data being continuously transmitted until the input request signal from the pre-processing circuit changes to "H" and the clock signal is supplied to the buffer upstream of the data processing circuit. The data length of input data is counted up for the duration that the input request signal is "H", and countdown is activated at the point in time at which the input request signal changes to "L" and input data ends. Countdown is thereby performed per data output after processing by the data processing circuit has ended, and clock-signal supply is stopped at the point in time at which the count reaches zero.

Performing control of clock-signal supply in a circuit range that includes processing upstream of the data processing circuit in this way produces the effect of activating the processing module for only the period required for data processing on the variable-length input data, and reducing unnecessary power consumption.

In another Embodiment, an example will be shown in the case where the present invention is applied to a circuit other than an image processing circuit.

Figure 5:
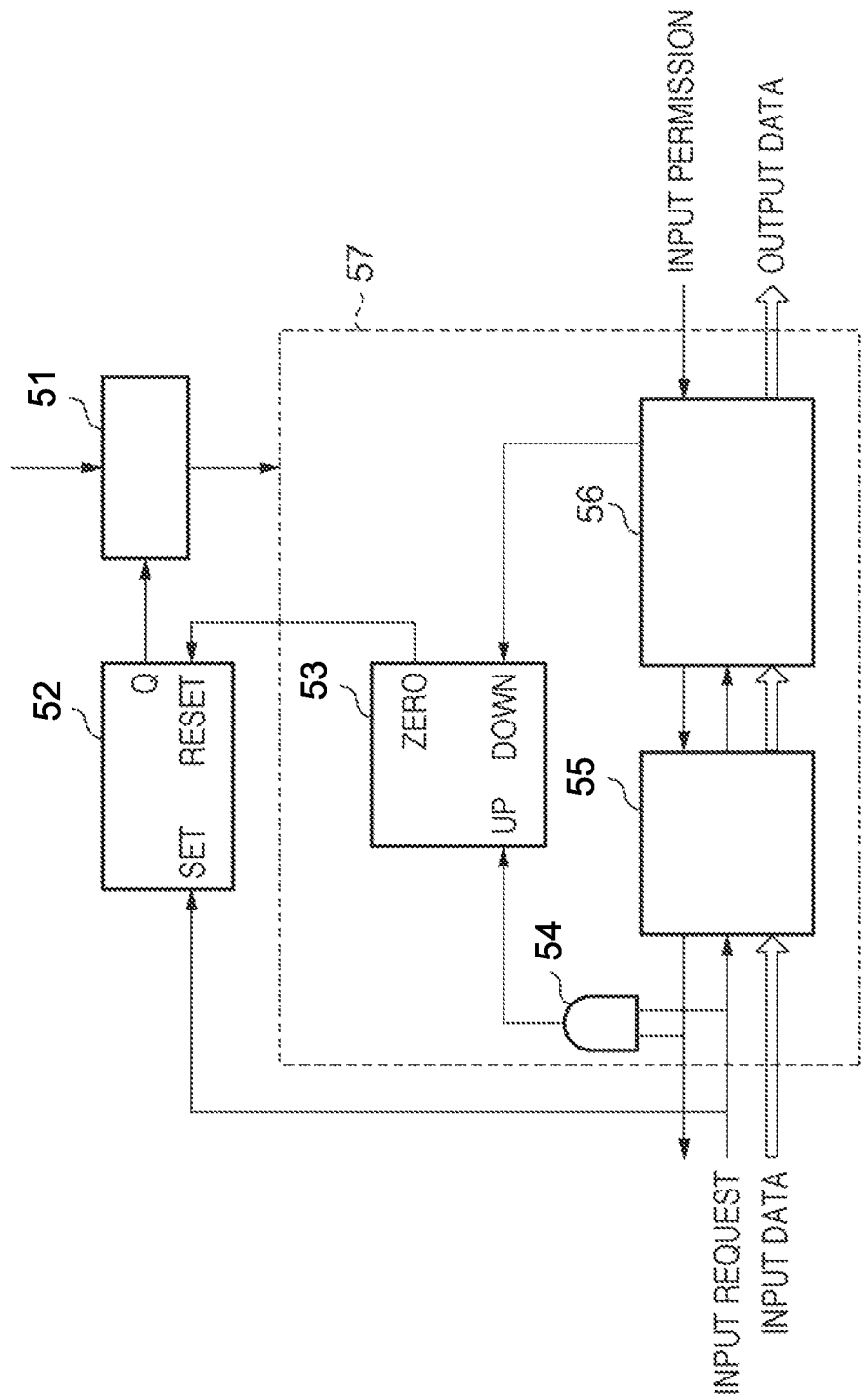
FIG. 5 is a block diagram of a processing circuit module.

FIG. 5 is a schematic block diagram of the case where the present invention is applied to a transmission circuit for asynchronous serial communication comprising a clock signal stopping unit 51, a latch circuit 52, a count unit 53, an input count AND circuit 54, an input buffer 55, a transmission circuit 56 for asynchronous serial communication, and a clock-signal stop target circuit range 57.

Figure 6:
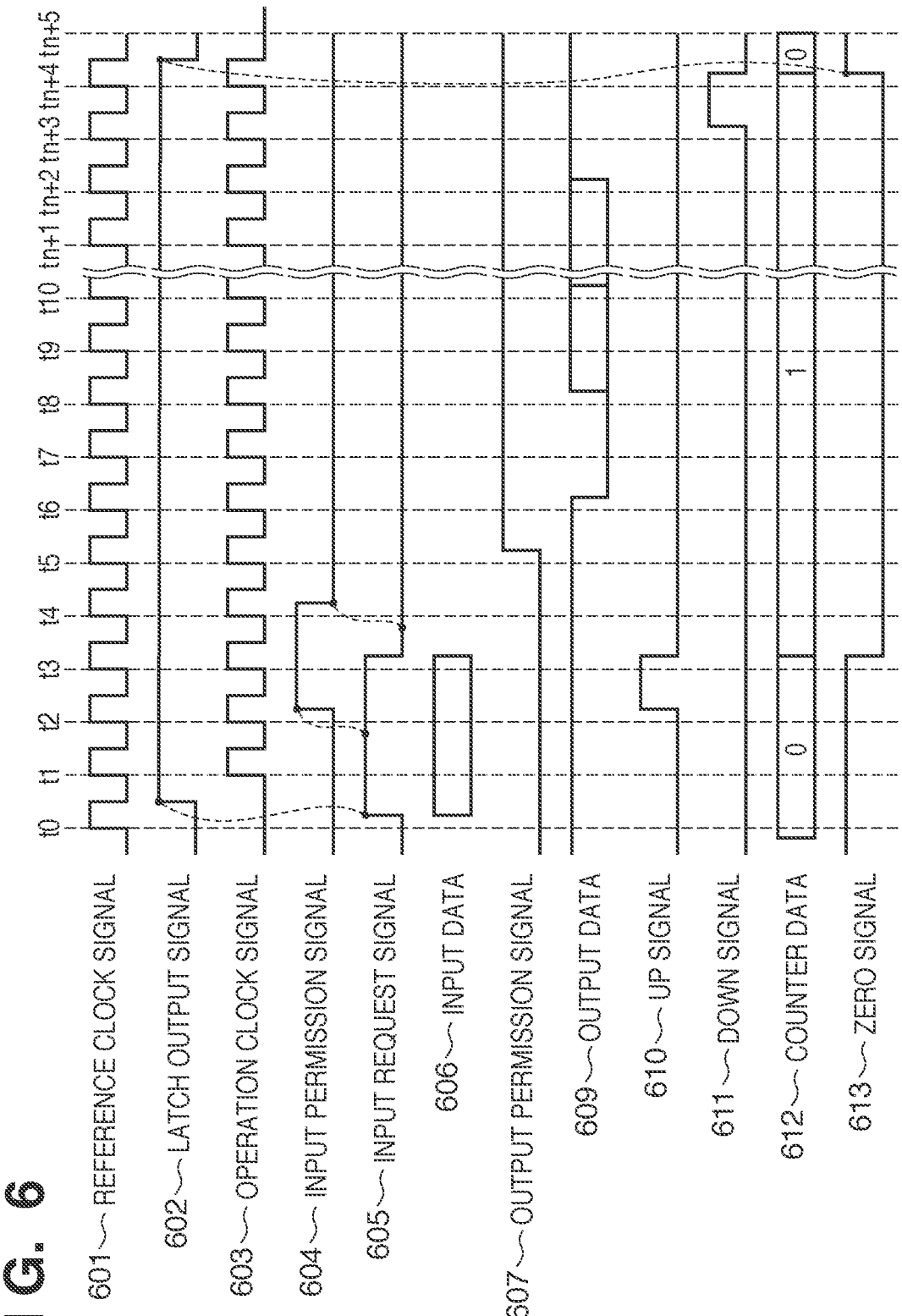
FIG. 6 is a timing chart of the processing circuit module.

FIG. 6 shows a timing chart for the transmission circuit in this Embodiment. In this example, to simplify the description, asynchronous serial communication is assumed to involve performing data output at a rate of two internal clock-signal cycles, and to employ transmission flow control.

In FIG. 6, an input request signal 605 for writing transmitted data to the input buffer 55 is asserted ("H") at t0. Following the assertion ("H") of this input request signal 605, a latch output signal is asserted ("H"), and clock-signal supply to each block in the clock-signal stop target circuit range 57 is started from t1. The input buffer 55 asserts ("H") an input permission signal 604 at t2 after clock-signal supply has been started, because of the input request signal 605 being asserted ("H").

A pre-processing circuit for writing data to the input buffer finishes writing the required number of data (in this example, the number of data is 1), and de-asserts the input request signal 605 at t3. Because the input request signal 605 and the input permission signal 604 are both asserted ("H"), the count value of the count unit 13 is counted up from 0 to 1, and the Zero signal is de-asserted ("L") at the same timing.

Meanwhile, the transmission circuit 56 for serial communication waits without performing output until an output permission signal 607 of the other communication party is asserted ("H"), and starts output from t6 after confirming output permission from the other communication party at t5. In the present embodiment, serial communication is depicted with the start bit and the stop bit both being 1 bit. The transmission circuit 56 outputs transmission data per bit from t8 after outputting the start bit at t6 and t7.

After the last bit output has been performed at tn+2, the transmission circuit 56 starts transmission of the stop bit, and outputs a Down signal indicating the transmission end of one piece of data at tn+3 at the end of the stop bit. In response to this output, the count unit 13 returns the count value from 1 to 0, and the Zero signal is asserted ("H") as a result. In response to the assertion ("H") of the Zero signal, the latch output signal is de-asserted ("L"), and the clock-signal stopping unit 11 thereby stops clock-signal supply of the operation clock signal from tn+5.

In this Embodiment, control of the clock-signal supply is performed in this way on a circuit range that includes processing upstream of a serial data transmission circuit using start and stop bits. The effect is thus produced of being able to activate the processing module for only the period required for data processing on the variable-length data, and reducing unnecessary power consumption.

In another Embodiment, an example will be described in which the present invention is applied to a processing circuit in which the ratio of the amount of input data to the amount of output data is uniquely determined to be N to 1, where N is a positive integer. That is, similarly to the above embodiments, the input data amount can be measured by a counter, and the clock signal can be stopped when the data amount of output data reaches 1/N after predetermined data processing. The above embodiments were equivalent to the case where N=1.

Figure 7:
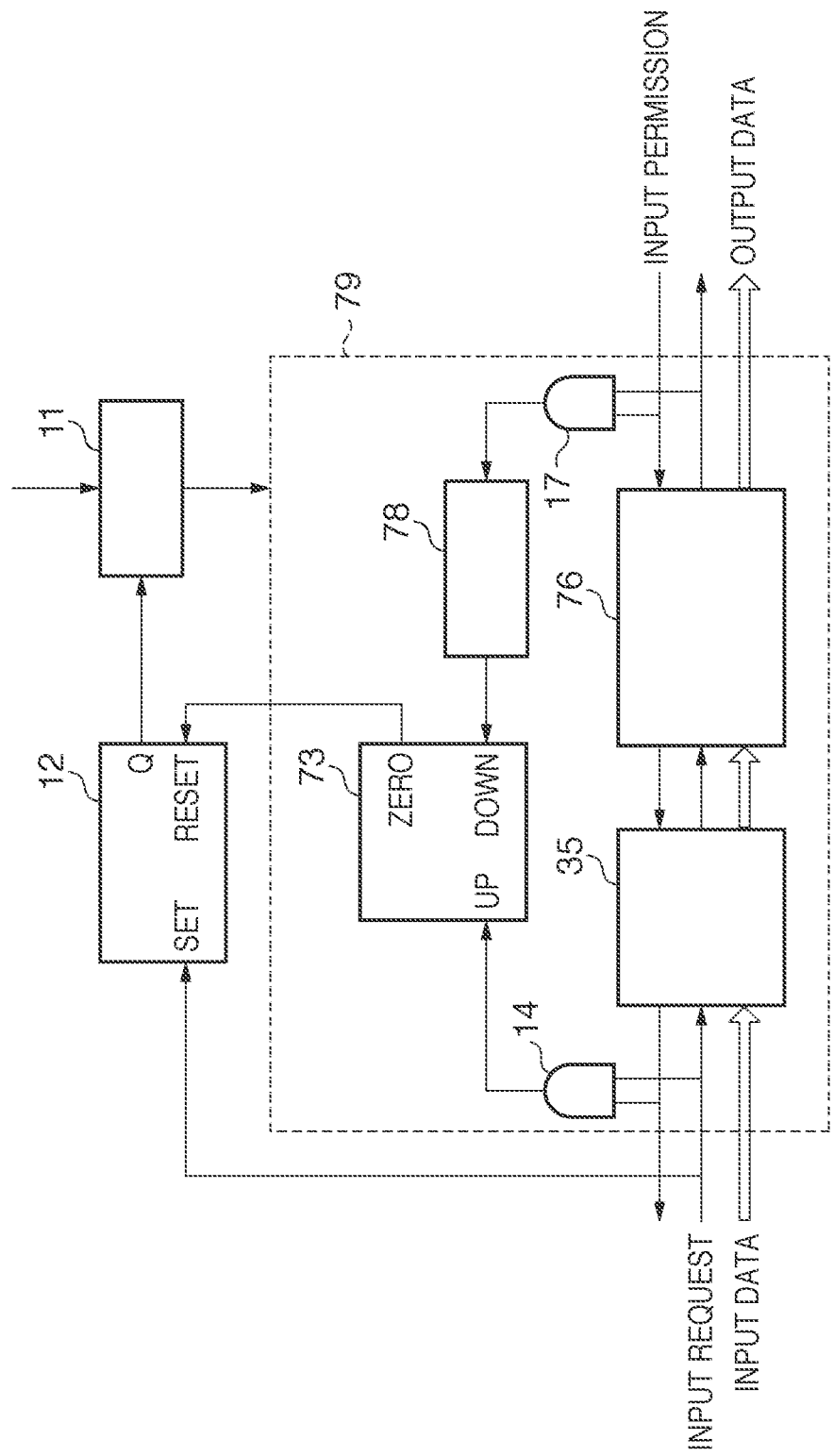
FIG. 7 is a block diagram of a processing circuit module.
Figure 8:
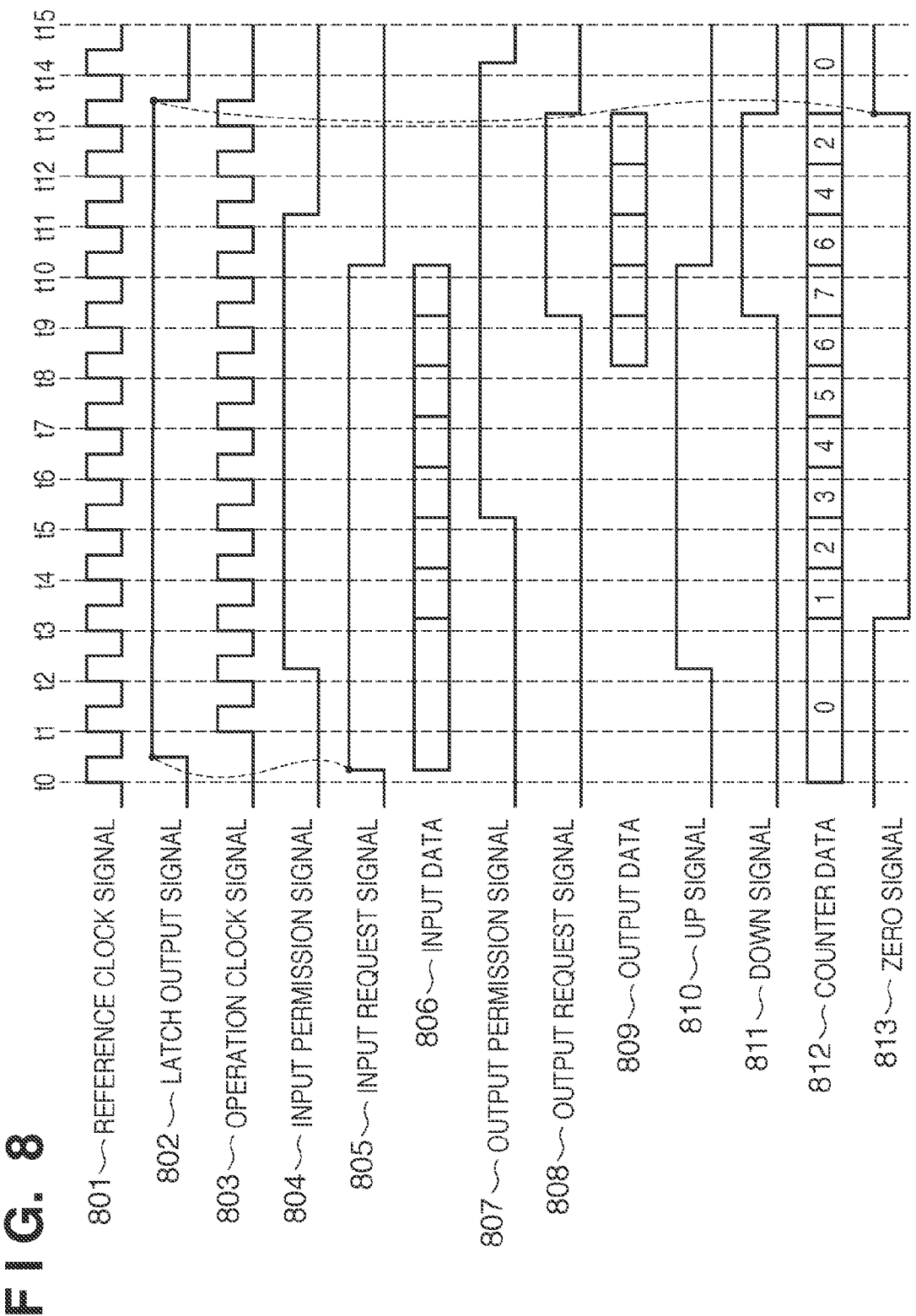
FIG. 8 is a timing chart of the processing circuit module.

This example is shown in FIGS. 7 and 8. This is, for example, the case where blend processing on image data is performed, with the number of input data being twice the number of output data, which is equivalent to N=2. In FIG. 7, a processing module 76 is an image data blend processing circuit, and FIG. 8 shows a timing chart in the case where the number of pieces of input data is eight and the number of pieces of output data is four.

In FIG. 8, an input request signal 805 is asserted by a pre-processing circuit (not shown). Following this, the latch signal is asserted ("H"). Meanwhile, because the input buffer 35 is also a clock signal stop target, an input permission signal 804 has not been asserted at this time.

Following the assertion ("H") of the latch signal, clock signal supply of an operation clock signal 803 to the blocks in the range indicated by a clock-signal control range 79 is started at t1. Following the start of clock-signal supply of the operation clock signal 803 and the assertion ("H") of the input request signal 805, the input permission signal 804 is asserted ("H") at t2, and reception of eight pieces of data is started at t3. Following this, the count value of a count unit 73 increases, and a Zero signal 813 is de-asserted ("L") at t3.

Counter data 812 of the count unit 73 is counted up from t3 to t9. Meanwhile, four pieces of output data are output continuously from t9. The counter data 812 of the count unit 73 is thereby counted down from the accumulated value every N (=2) pieces, and returns to 0 at t13, following which the Zero signal is asserted ("H"), and clock-signal supply to the operation clock signal stop target circuit range 79 is stopped at t14.

Figure 9:
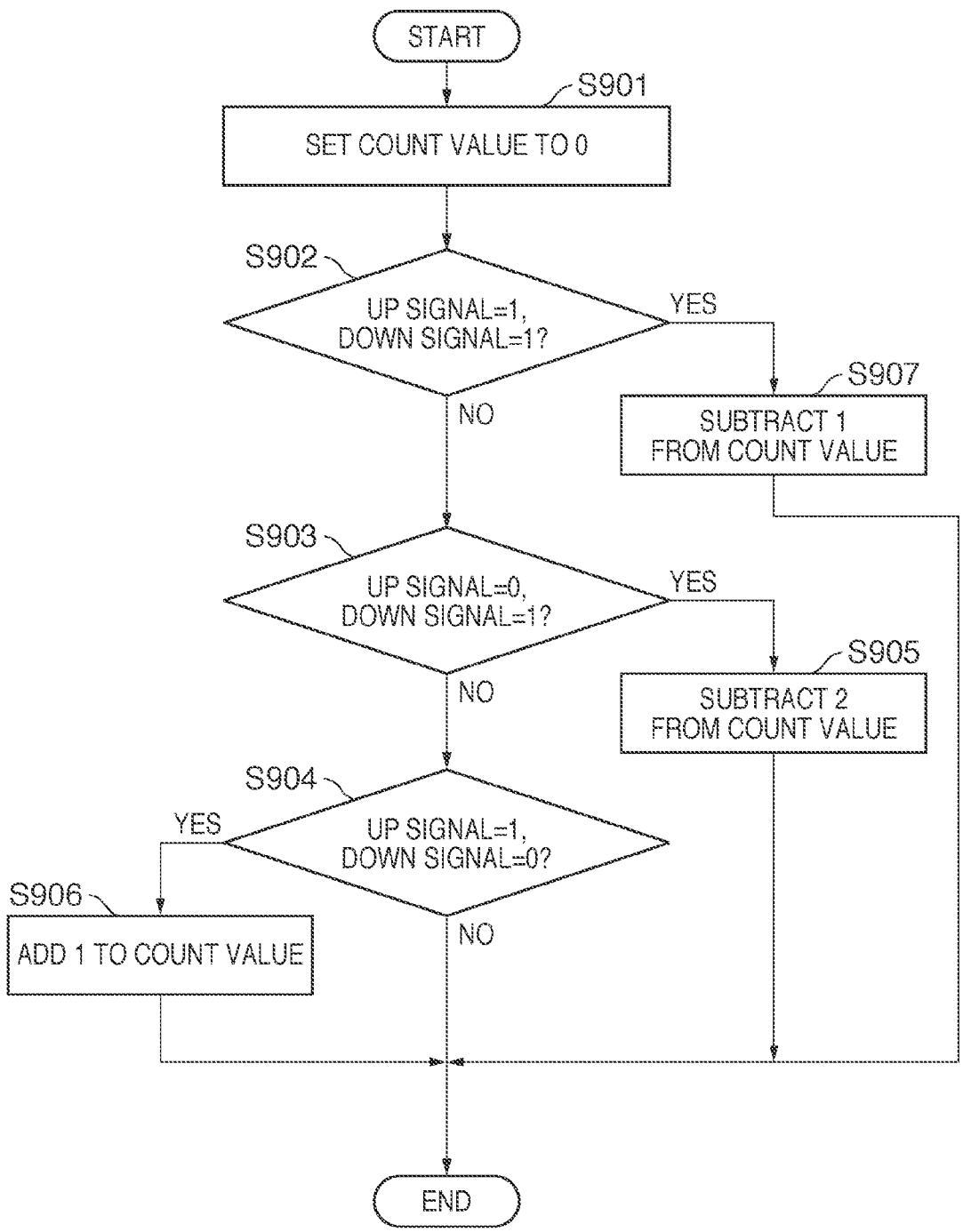
FIG. 9 is an operation flowchart of a count unit.

An actual count unit is realizable as a result of the count unit 73 and a coefficient unit 78 in FIG. 7 performing the operations of a flowchart shown in FIG. 9. That is, at step 901, the count value is reset to zero by a reset signal (input permission signal). At step S902, it is determined whether the Up signal is H and the Down signal is H. If Yes, the processing proceeds to step S907. If No, the processing proceeds to step S903.

At step S903, it is determined whether the Up signal is L and the Down signal is H. If Yes, the processing proceeds to step S905. If No, the processing proceeds to step S904. At step S904, it is determined whether the Up signal is H and the Down signal is L. If Yes, the processing proceeds to step S906. If No, the processing ends. At step S905, 2 is subtracted from the count value, and the processing returns to step S902. At step S906, 1 is added to the count value, and the processing returns to step S902. At step S907, 1 is subtracted from the count value, and the processing returns to step S902.

In the present embodiment, an example of a processing circuit was shown in which the coefficient unit is applied on the output side, and the relation of the number of pieces of input data to the number of pieces output data is uniquely determined, but the coefficient unit can also be applied on the input side or on both the input and output sides depending on the processing content. That is, the present invention can also be applied to the case where the ratio of input data to output data is 1 to N, where N is a positive integer, and the amount of output data processed is greater than the amount of input data.

The present invention is in this way able to expand the applicable range to an arbitrary processing circuit in which the relation of the number of input data to the number of output data is uniquely determined.

Figure 10:
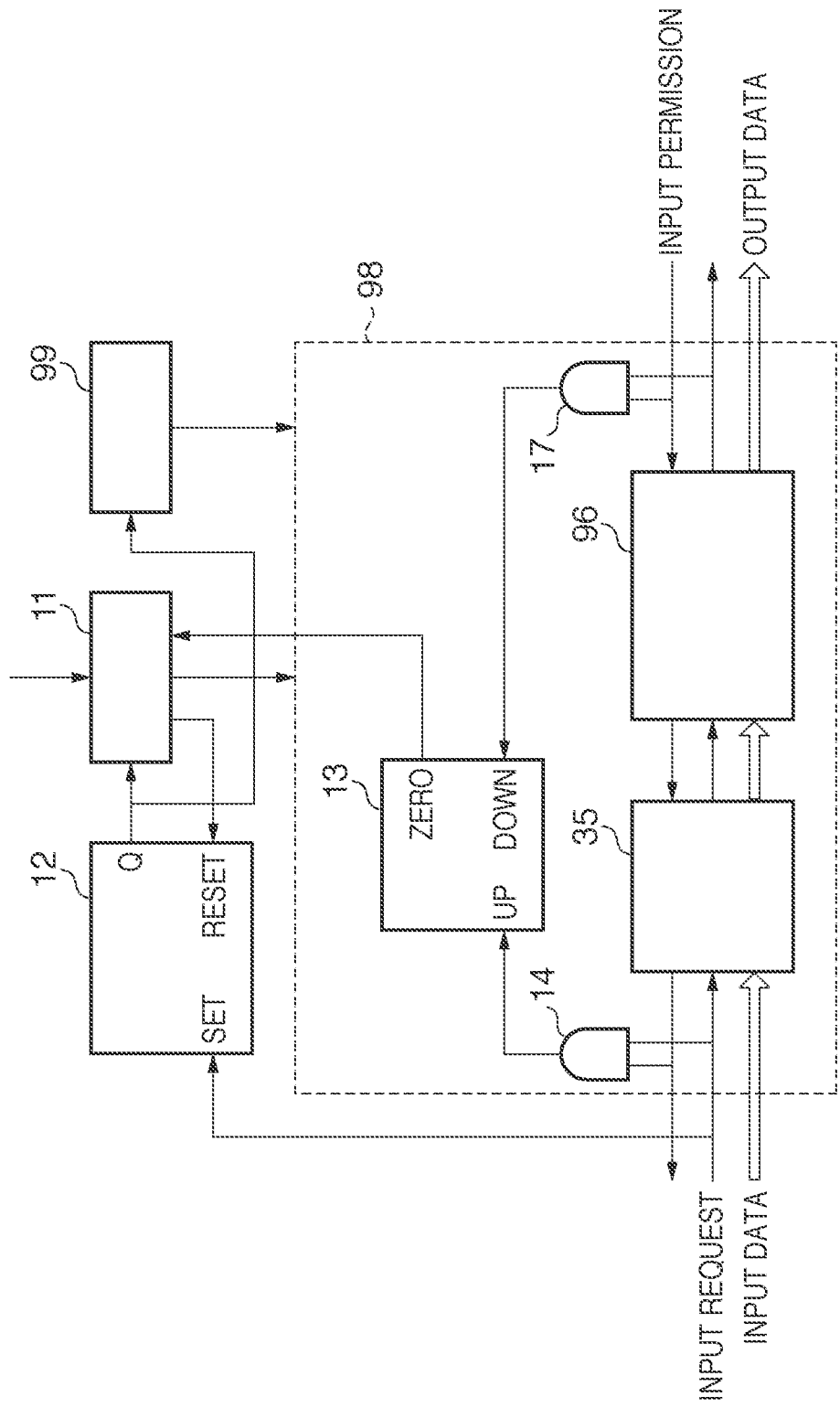
FIG. 10 is a block diagram of a processing circuit module.

FIG. 10 shows an example of a block diagram configured to perform clock-signal control and supply voltage control.

Figure 11:
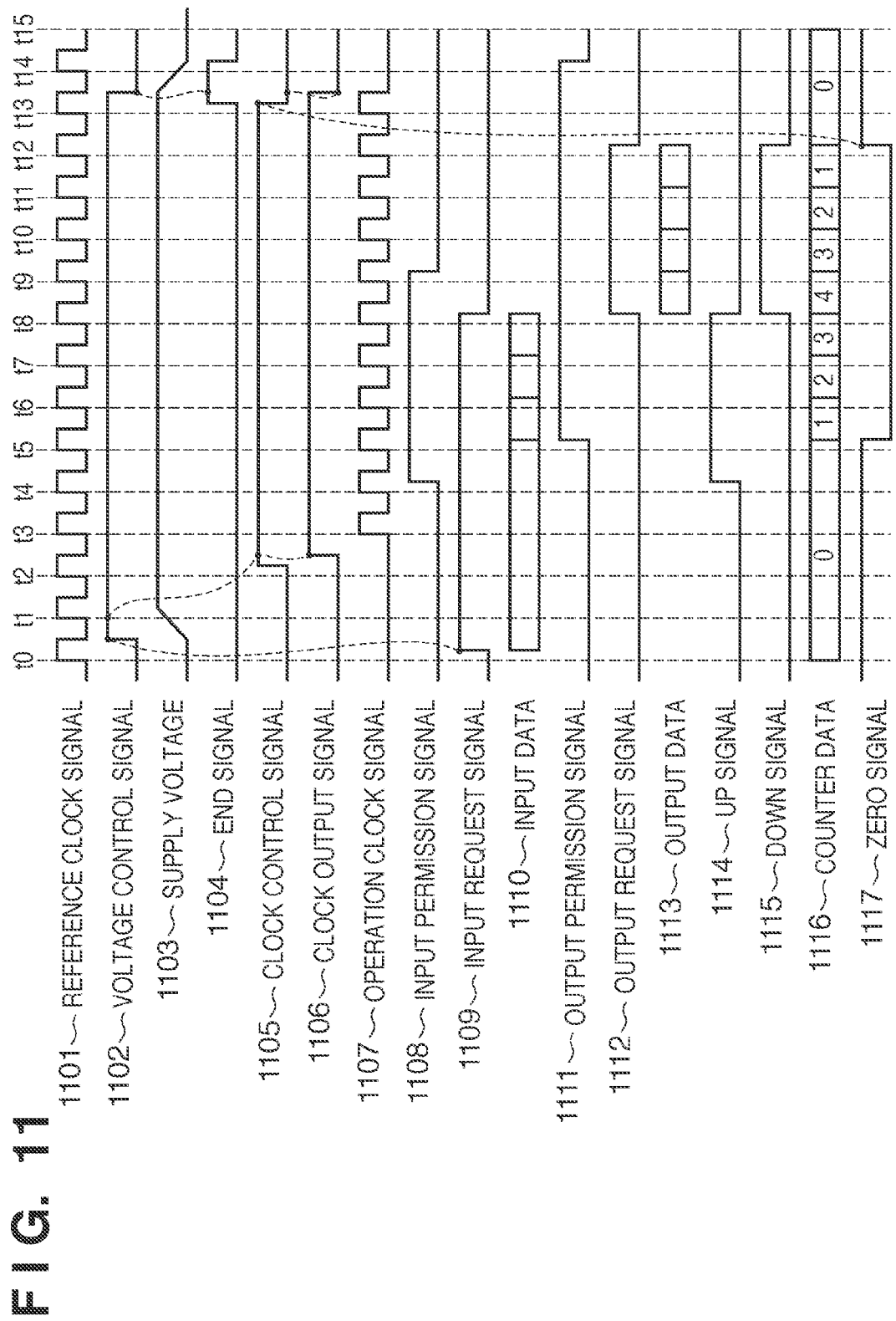
FIG. 11 is a timing chart of the processing circuit module.

Also, a timing chart example illustrating circuit operations in the present embodiment is shown in FIG. 11. In FIG. 11, an input request signal from a pre-processing circuit (not shown) is asserted. Following this, a control signal output from the latch circuit 12 is asserted ("H"). As a result of this signal being asserted, a voltage control unit 99 changes the supply voltage supplied to a power saving control target circuit range 98 from a sleep mode voltage to an active mode voltage. The sleep mode voltage is lower than the active mode voltage.

In response to the assertion ("H") of the control signal from the latch circuit 12 and the voltage control unit 99 returning a supply voltage 1103 of the power saving control target circuit range 98 to the active mode voltage, the clock-signal stopping unit 11 asserts a clock-signal control signal 1105 (t2 in FIG. 11). The assertion timing of the clock control signal 1105 depends on the configuration of the voltage control unit 99 and the circuit size of the power saving control target circuit range 98. This timing may be determined by a time set during the design stage (number of clock signals), or by monitoring the actual supply voltage level.

In response to the assertion ("H") of the clock control signal 1105, a clock output signal is asserted. The clock output signal 1106 can be configured by receiving the clock control signal 1105 with the latch circuit. The clock output signal 1106 is asserted ("H"), and operation clock-signal supply to the power saving control target circuit range 98 is started (t3). The input buffer 35 asserts ("H") an input permission signal 1108 at t4 following the clock-signal supply start of the operation clock signal and the assertion ("H") of an input request signal 1109, and starts import of input data. Following this, the count unit 13 performs a count up operation, counter data 1116 is counted up, and a Zero signal 1117 is de-asserted ("L") (t5).

Output of output data 1113, which is the processing result output, is started from t8, and following this, the count unit 13 performs countdown, the counter data 1116 of the count unit 13 returns to 0 at t12, and the Zero signal 1117 is de-asserted ("L"). In response to the de-assertion of the Zero signal 1117, the clock-signal stopping unit 11 de-asserts ("L") the clock control signal 1105, after which an end signal 1104 is asserted ("H") with respect to a reset input of the latch circuit 12, in order to set the voltage control unit 99 to the sleep voltage. As a result of the assertion ("H") of the end signal 1104, the latch circuit 12 de-asserts ("L") a voltage control signal 1102, and the voltage control unit 99 switches the supply voltage 1103 to the power saving control target circuit range 98 to the sleep mode voltage.

Figure 12:
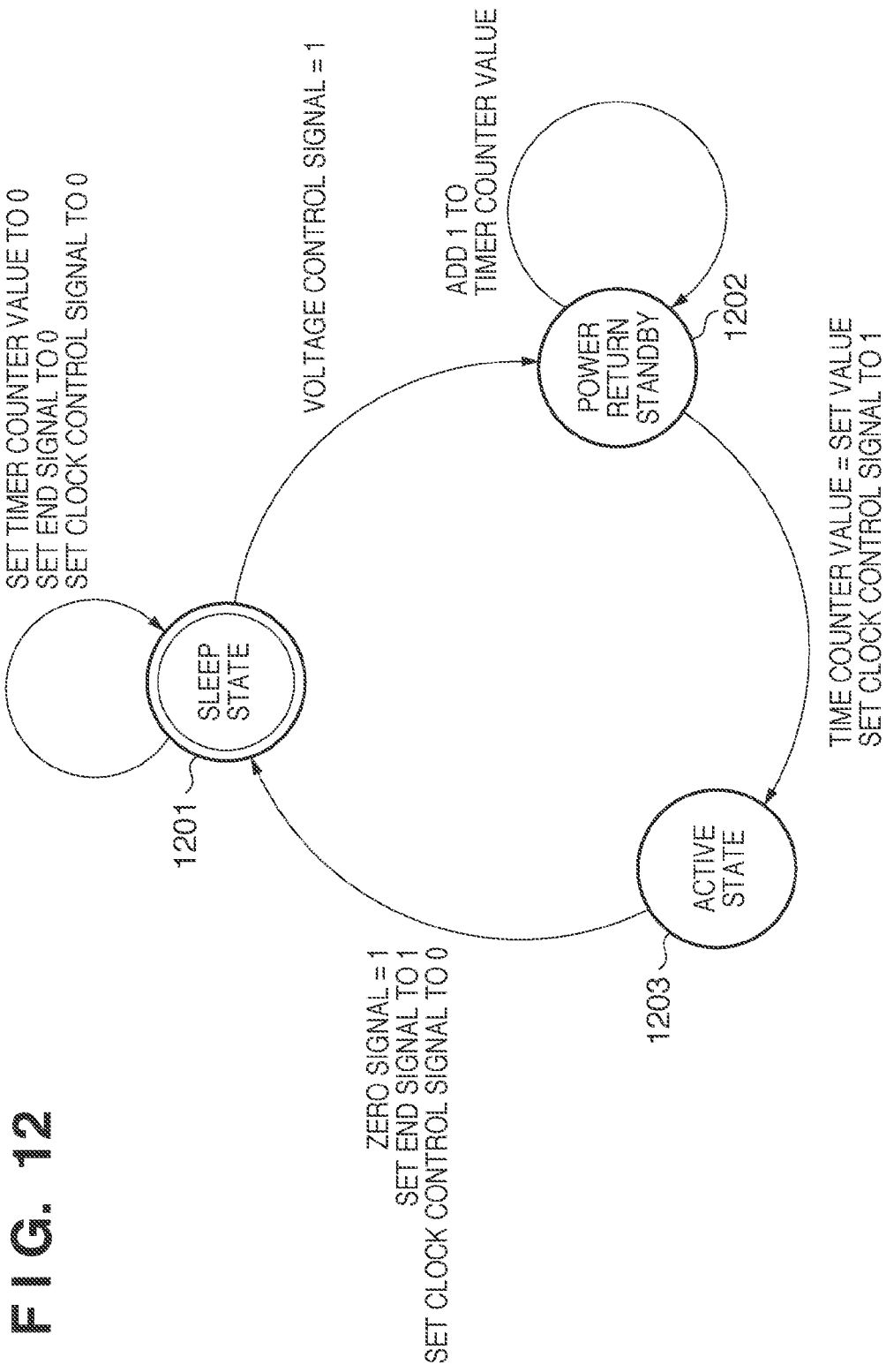
FIG. 12 is a state transition diagram of a clock-signal stopping unit.

The clock-signal stopping unit 11 complying with the timing chart of FIG. 11 can be realized with the state transition diagram shown in FIG. 12. In FIG. 12, the stopping unit is firstly in a "sleep state" 1201, which is an initial state in which a timer counter value is zero. This timer counter measures standby time. This standby time denotes the time from when a voltage control signal for instructing that the voltage return to an active state voltage is instructed to the voltage control unit 99 until when the voltage is actually returned to the operating voltage. If the circuit has a function of checking the actual voltage, this timer counter is unnecessary.

Also, in the "sleep state" 1201, the end signal and the clock control signal are both set to 0. When a voltage control signal is asserted, the state moves to "power return standby" 1202. In this state, the value of the timer counter is increased by 1 per clock signal, while waiting for a preset time to elapse. At the point in time at which the value of the timer counter reaches the set value, the state moves to an "active state" 1203. In this state, clock signal supply is performed in order to operate the processing circuit, and the clock control signal is asserted from the time of state transition. A condition for moving from the "active state" 1203 to the "sleep state" 1201 is the Zero signal being asserted, at which time the end signal is asserted, and the clock control signal is de-asserted.

Figure 13:
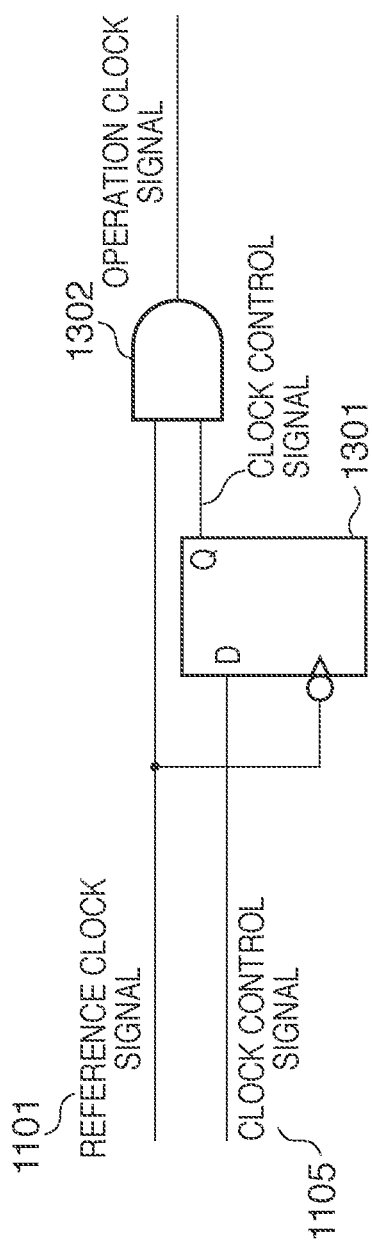
FIG. 13 shows an example clock-signal stopping unit.

Also, the specific configuration for clock signal stoppage shown in FIGS. 10 and 11 can be realized with the configuration of a D latch and an AND circuit shown in FIG. 13. In other words, as a result of the clock control signal 1105 being asserted to "H", the output of a D latch 1301 changes to "H", and a reference clock signal 1101 is output as an operation clock signal 1107 from the output of an AND circuit 1302.

Figure 14:
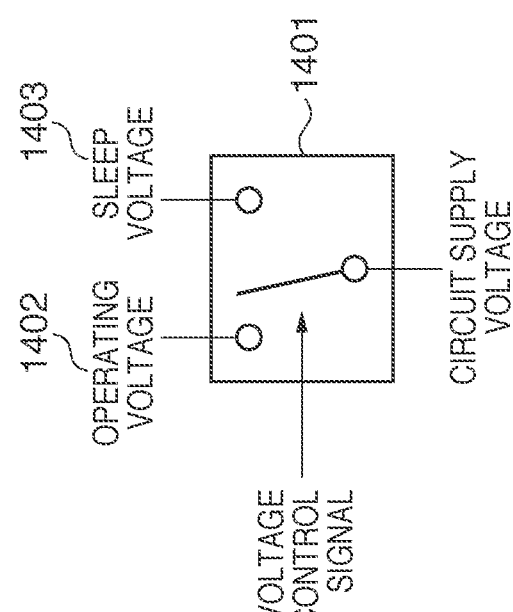
FIG. 14 shows example voltage control unit.

A specific example of an actual voltage control circuit is realizable with a switch circuit 1401 such as shown in FIG. 14. In other words, as a result of the assertion ("H") or de-assertion ("L") of the voltage control signal 1102, switching between an operating voltage 1402 and a sleep voltage 1403 is performed. The sleep voltage referred to here can be a voltage that maintains the circuit in a current state, because clock-signal supply is not performed when in the sleep mode.

As described above, by adopting the configuration of this Embodiment, an effect can be produced of enabling unnecessary power consumption to be further reduced by also controlling the supply voltage to the processing module, in addition to the clock signal control optimized for input of input data and output thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-285742, filed Dec. 16, 2009, which is hereby incorporated by reference herein in its entirety.

What is claimed is:

1. A data processing apparatus comprising:
a receiving unit configured to receive input data including processing-target data from outside;
an acquiring unit configured to acquire a data amount of the processing-target data included in the received input data;
a data processing unit configured to perform predetermined processing on the processing-target data at least one time, and to output a result of the predetermined processing as output data; and
a control unit configured to set the data processing unit to an active state by starting the supply of a clock signal to the data processing unit based on reception of the input data by the receiving unit, and when the data amount of the output data reaches the data amount of data obtained by performing the predetermined processing on the processing-target data, to set the data processing unit to a sleep state in which power consumption is less than in the active state by stopping the supply of the clock signal to the data processing unit.

2. The data processing apparatus according to claim 1, further comprising a storage unit configured to store the processing-target data,
wherein the data processing unit reads out the processing-target data from the storage unit using the supplied clock signal.

3. The data processing apparatus according to claim 1,
wherein the predetermined processing is processing in which the ratio of the amount of the processing-target data to the amount of the output data is N to 1, where N is a positive integer,
wherein the acquiring unit acquires the number of received clock signals required for reception of the processing-target data, and
wherein the control unit stops the supply of the clock signals, when the number of clock signals from the start of the output of the output data exceeds 1/N of the number of received clock signals.

4. The data processing apparatus according to claim 1, further comprising a data supplying unit configured to supply the input data to the receiving unit,
wherein the data supply unit repeatedly transmits head data of the processing-target data included in the input data, for a period from when the receiving unit receives the input data until when the data processing unit receives the receive supply of the clock signal clock and is activated.

5. A data processing apparatus comprising:

a receiving unit configured to receive input data including processing-target data from outside;

an acquiring unit configured to acquire the data amount of the processing-target data included in the received input data;

a data processing unit configured to perform predetermined processing on the processing-target data at least one time, and to output a result of the predetermined processing as output data; and a control unit configured to set the data processing unit to an active state by supplying a first voltage to the data processing unit based on reception of the input data by the receiving unit, and when the data amount of the output data reaches the data amount of data obtained by performing the predetermined processing on the processing-target data, to set the data processing unit to a sleep state in which power consumption is less than in the active state by supplying a second voltage that is lower than the first voltage to the data processing unit.

6. The data processing apparatus according to claim 5, wherein the predetermined processing is processing in which the ratio of the amount of the processing-target data to the amount of the output data is N to 1, where N is a positive integer, wherein the acquiring unit acquires the number of received clock signals required for reception of the processing-target data, and wherein the control unit supplies the second voltage, when the number of clock signals from the start of the output of the output data exceeds 1/N of the number of received clock signals.

7. A data processing apparatus comprising:

a receiving unit configured to receive input data including processing-target data from outside;

an acquiring unit configured to acquire a data amount of the processing-target data included in the received input data;

a data processing unit configured to perform predetermined processing on the processing-target data at least one time, and to output a result of the predetermined processing as output data; and a control unit configured to set the data processing unit to an active state by starting the supply of a clock signal to the data processing unit based on reception of the input data by the receiving unit, and when the data amount of the output data reaches the data amount of data obtained by performing the predetermined processing on the processing-target data, to set the data processing unit to a sleep state in which power consumption is less than in the active state by lowering a frequency of the clock signal to the data processing unit.

* * * * *